United States Patent
Hughes et al.

(10) Patent No.: US 12,153,623 B2
(45) Date of Patent: *Nov. 26, 2024

(54) METHOD AND SYSTEM FOR DETERMINING PRODUCT SIMILARITY IN DIGITAL DOMAINS

(71) Applicant: Channelsight Limited, Dublin (IE)

(72) Inventors: Mark Hughes, Almeria (ES); Enda Farrell, Dublin (IE)

(73) Assignee: CHANNELSIGHT LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,242

(22) Filed: Jan. 2, 2024

(65) Prior Publication Data

US 2024/0134903 A1 Apr. 25, 2024

Related U.S. Application Data

(63) Continuation of application No. 17/115,189, filed on Dec. 8, 2020, now Pat. No. 11,966,436.

(30) Foreign Application Priority Data

Feb. 7, 2020 (EP) .................................... 20156023

(51) Int. Cl.
*G06F 16/583* (2019.01)
*G06F 18/2413* (2023.01)
(Continued)

(52) U.S. Cl.
CPC ...... *G06F 16/583* (2019.01); *G06F 18/24143* (2023.01); *G06F 40/284* (2020.01);
(Continued)

(58) Field of Classification Search
CPC ....................................................... G06F 16/583
(Continued)

(56) References Cited

U.S. PATENT DOCUMENTS 9,229,954 B2 * 1/2016 Wu .................... G06Q 30/0283
9,665,644 B1 * 5/2017 Song ..................... G11B 27/02
(Continued)

OTHER PUBLICATIONS

Li Juan et al: "Deep cross-platform product matching in e-commerce". Information Retrieval, Kluwer Academic Publishers, NL, vol. 23, No. 2, Aug. 13, 2019, pp. 136-158.
(Continued)

*Primary Examiner* — Reza Nabi
(74) *Attorney, Agent, or Firm* — Shumaker, Loop & Kendrick, LLP; James D. Miller

(57) ABSTRACT

A method and system of matching a first product with a second product. The method including converting first product metadata with image metadata and textual data to a first product feature vector. Further, determining a distance between the first product feature vector and a second product feature vector of the second product, the second product feature vector stored in a database of product feature vectors. The distance is compared to a threshold distance, and if the distance is within the threshold distance, validating a match between the first product feature vector and the second product feature vector. The validating further includes geometrically verifying the image metadata of the first product corresponds to image metadata of the second product.

14 Claims, 6 Drawing Sheets

(51) Int. Cl.
*G06F 40/284* (2020.01)
*G06F 40/30* (2020.01)
*G06N 3/045* (2023.01)
*G06N 3/08* (2023.01)
*G06V 10/44* (2022.01)
*G06V 10/74* (2022.01)
*G06V 10/764* (2022.01)
*G06V 10/82* (2022.01)

(52) U.S. Cl.
CPC ............ *G06F 40/30* (2020.01); *G06N 3/045* (2023.01); *G06N 3/08* (2013.01); *G06V 10/454* (2022.01); *G06V 10/761* (2022.01); *G06V 10/764* (2022.01); *G06V 10/82* (2022.01)

(58) Field of Classification Search
USPC .......................................................... 706/25
See application file for complete search history.

(56) References Cited

U.S. PATENT DOCUMENTS

| | | | | |
|---|---|---|---|---|
| 11,037,071 | B1 * | 6/2021 | Tekiela | G06V 10/764 |
| 11,037,222 | B1 * | 6/2021 | Natesh | G06Q 30/0643 |
| 11,048,773 | B1 * | 6/2021 | Gokhan | G06F 18/285 |
| 11,294,971 | B1 * | 4/2022 | Gokhan | G06Q 10/0875 |
| 11,494,686 | B1 * | 11/2022 | Mandayam Comar | G06N 20/00 |
| 11,704,692 | B2 * | 7/2023 | Kendall | G06Q 30/0255 705/14.53 |
| 2013/0318101 | A1 * | 11/2013 | Chen | G06F 16/3323 707/748 |
| 2014/0280241 | A1 * | 9/2014 | Reblitz-Richardson | G06F 16/2246 707/749 |
| 2016/0055568 | A1 * | 2/2016 | Vidal | G06F 16/5846 705/26.7 |
| 2016/0140643 | A1 * | 5/2016 | Nice | G06F 16/3344 705/26.7 |
| 2018/0075508 | A1 * | 3/2018 | Hewavitharana | G06N 20/00 |
| 2019/0034994 | A1 * | 1/2019 | Wu | G06Q 30/0631 |
| 2019/0340949 | A1 * | 11/2019 | Meisner | G09B 5/04 |
| 2019/0378204 | A1 * | 12/2019 | Ayush | G06Q 30/0643 |
| 2020/0177942 | A1 * | 6/2020 | Wu | G06F 16/3347 |
| 2021/0248446 | A1 * | 8/2021 | Hughes | G06F 18/22 |
| 2022/0309522 | A1 * | 9/2022 | Kanjilal | G06Q 30/0202 |
| 2023/0222561 | A1 * | 7/2023 | Schlaich | G06Q 30/0627 705/26.7 |
| 2023/0306717 | A1 * | 9/2023 | Shiraishi | G06V 10/778 |

OTHER PUBLICATIONS

Uma Sawant et al: "Product discovery from E-commerce listings via deep text parsing", Data Science and Management of Data, ACM, 2 Penn Plaza, Suite 701 New York, New York; Jan. 11, 2018; pp. 98-108.

* cited by examiner

Local Feature Validation

E.g. Local Feature Matching on two images of same object

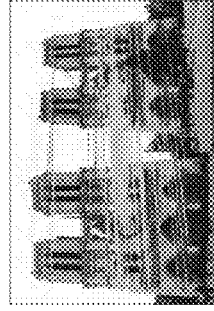

Step 1) Using local feature matching algorithm, find corresponding visual regions that correlate across two images. Threshold each corresponding region

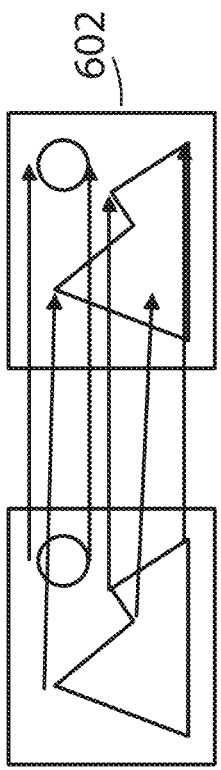

601

Step 2) Find a geometric model that fits each of the corresponding points. Eliminate any matches that don't fit this model. i.e. any match found outside of geometric structure of objects

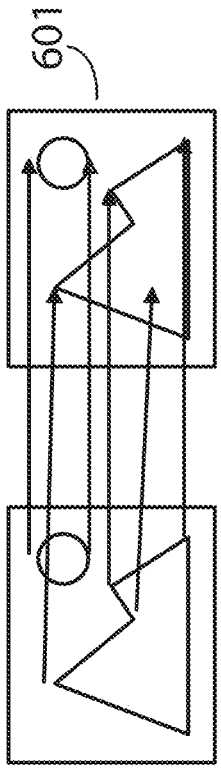

602

Step 3) Threshold number of corresponding regions that meet the geometric consistency test.

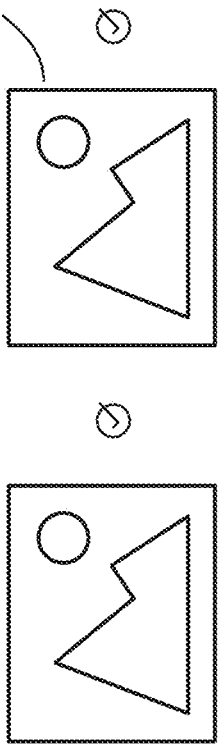

603

Step 4) If the number of corresponding matches is above a threshold, consider images a match

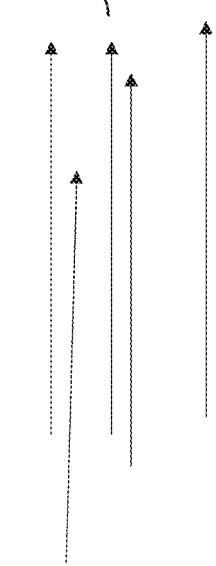

METHOD AND SYSTEM FOR DETERMINING PRODUCT SIMILARITY IN DIGITAL DOMAINS

CROSS-REFERENCE TO RELATED PATENT APPLICATION

The present disclosure is a continuation patent application of U.S. patent application Ser. No. 17/115,189 filed Dec. 8, 2020 which claims the benefit of EPO Patent Application No. EP 20156023.2 filed Feb. 7, 2020, the entire contents of each of which are hereby incorporated herein by reference.

FIELD OF THE INVENTION

The invention relates to a method, a computer readable programmable medium and an apparatus for automatic product recognition.

BACKGROUND

Product Recognition is a challenging task. Increasingly, users are looking to buy products on-line from well-known e-commerce web sites such as Amazon, Target, or Walmart. This increase in on-line trade has resulted in a corresponding increase in the interest of manufacturers in these online forums and indeed a desire for product coverage in these forums. As a result, there is increased investment in information technology in order to increase sales by means of implementing efficient product search services. A popular method is to offer straightforward web-services in order not only to find the review, specifications, availability and prices of products from different retailers but also to purchase them.

The evolution in portable electronic devices, such as smartphones and tablets, provides a perfect environment for on-line shopping. The goal of web services implemented on these devices is to provide an attractive and alternative environment for searching for product information and proceed to purchase these products.

Content Based Image Retrieval (CBIR) is increasingly used for product comparison to improve the search and retrieval of product information by looking at the content of images in order to return results that match a particular query. While CBIR improves the quality of the searching for the end user, it is desirable to refine the search process. Manufacturers and retailers often provide different information for their product, be it in terms of the description, the viewing angle of the product or the colour of the product. For example while a manufacturer may describe a cereal as "Oats, 1 kg Carton" the retailer may describe this same product as "Oats, classic pack". Imagery and description associated with the same products may vary from manufacturer to retailer. Retailers frequently use their own imagery and their own textual descriptions of the features and attributes to describe a product. This can lead to potentially large disparities between the metadata generated on both sides for identical products. Product metadata includes imagery and textual metadata associated with the product including the product name, the product description and product imager provided to demonstrate the product. These variations in metadata can lead to missed information in searches, inaccuracies in product matching and poor search results. It is desirable therefore for searching to improve the matching between manufacturer metadata for each product and the corresponding product provided in the retailer data base. This subsequently improves the search and retrieval process for the end user. Current mechanisms for improving matching of products rely on similarity metrics normally generated through the use of human defined feature sets between product metadata. These metrics however seldom capture the small nuances of change between two different human descriptions of a product and its attributes or the visual variation that can occur when products are photographed from different viewpoints or in different environments. The lack of robustness to these changes can lead to poor recall in these tasks. The present invention proposes a new mechanism of improving the reliability of a search.

SUMMARY OF INVENTION

In one aspect, the present invention provides a method of matching a first product with a second product, comprising: converting first product metadata comprising image metadata and textual data to a first product feature vector; determining a distance between the first product feature vector and a second product feature vector of the second product, said second product feature vector stored in a database of product feature vectors; comparing said distance to a threshold distance and wherein if the distance is within the threshold distance, and validating a match between the first product feature vector and the second product feature vector.

Validating may comprise geometrically verifying the image metadata of the first product corresponds to image metadata of the second product.

This method capitalizes on a combination of semantic similarity of textual descriptions combined with visual similarity of associated images to optimise a product search and match. Such a system is suitable for use in fraud detection, plagiarism detection, product metadata verification, product searching and identification and provides a robust approach with higher accuracy in search.

Converting the product metadata to a product feature vector may comprise calculating a feature embedding for each product.

Calculating a feature embedding for each product may comprise extracting textual metadata and pre-processing the textual metadata to filter unnecessary text.

Pre-processing may comprise at least one of tokenization and stemming of the textual metadata to form a plurality of textual tokens.

The method as described herein may further comprise representing said each of said textual tokens of the plurality of textual tokens as a semantic feature embedding.

In addition, the methods may further comprise stacking the feature embedding for each textual tokens into an N×M matrix wherein N is the number of tokens in the plurality of tokens and M is an embedding vector size.

Calculating the feature embedding for each product may further comprise representing said image metadata as a semantic feature embedding.

Calculating the feature embedding for each product may comprise combining the semantic feature embedding representing the textual token and the semantic feature embedding representing the image to provide the product feature vector.

Determining a distance may comprises performing a nearest neighbor search between the first product feature vector and a plurality of product feature vectors in a database of product feature vectors.

The nearest neighbor search may comprise grouping a plurality of first product feature vectors and indexing the grouping, and applying at least one of locally-sensitive hashing, k-dimensional trees, vantage point trees or hierarchical clustering.

Geometrically verifying the image metadata of the first product may comprise determining corresponding visual regions that correlate across the image metadata of the first product and image metadata of the second product; selecting a geometric model to apply to the determined corresponding visual regions; determine a number of matching points of interest within the geometric model; compare said number of matches with a predetermined threshold and verifying the image metadata based on the comparison.

Converting first product metadata comprising image metadata and textual data to a first product feature vector may comprise using a first neural network model to generate the sematic feature embedding representative of the textual metadata and using a second neural network model to generate the semantic feature embedding representative of the image data, concatenating the outputs of the first model and the second model and inputting the concatenation as an input to a third network to generate the first product vector.

The first, second and third models may be trained using pairs consisting of first products and second products.

There is also provided a computer program comprising program instructions for causing a computer program to carry out the above method which may be embodied on a record medium, carrier signal or read-only memory.

There is also provided a system for product recognition as described above comprising means for converting first product metadata comprising image metadata and textual data to a first product feature vector; means for determining a distance between the first product feature vector and a second product feature vector of the second product, said second product feature vector stored in a database of product feature vectors; means for comparing said distance to a threshold distance and wherein if the distance is within the threshold distance, and means for validating a match between the first product feature vector and the second product feature vector.

Means for validating may comprise means for geometrically verifying the image metadata of the first product corresponds to image metadata of the second product.

BRIEF DESCRIPTION OF THE DRAWINGS

Embodiments of the invention will be described, by way of example only, with reference to the accompanying drawings in which:

FIG. 6 describes local feature validation in accordance with an embodiment of the invention.

DETAILED DESCRIPTION OF THE DRAWINGS

Figure 2:
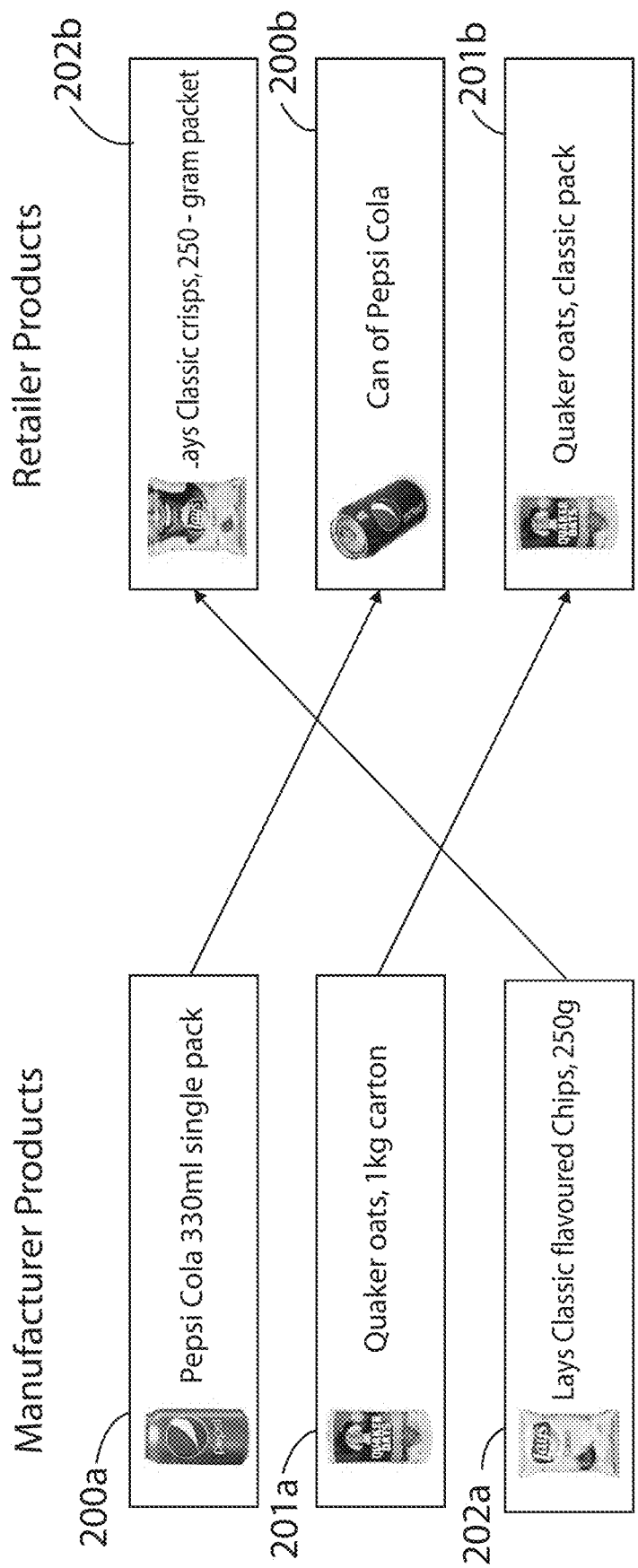
FIG. 2 is an example of manufacturer's database and retailer's data base images for the same product.
Figure 3:
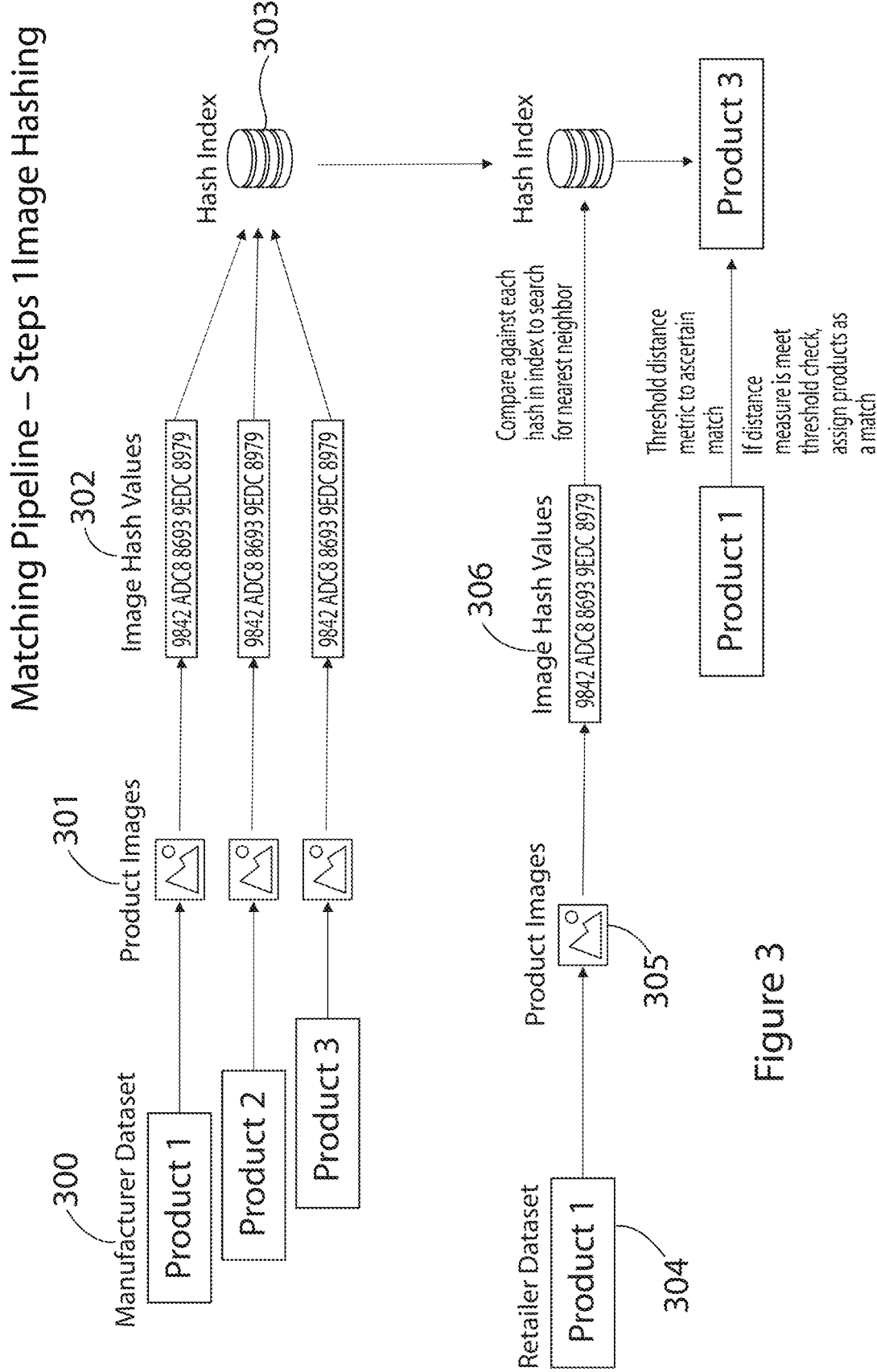
FIG. 3 is a flow chart of the matching pipeline in accordance with the present invention.

Methods and systems are provided herein for providing a method of matching and validating a match of a product across a plurality of sources thus capturing the small nuances of change between two different human descriptions of a product and its attributes or the visual variation that can occur when products are photographed from different viewpoints or in different environments. Manufacturers can have an image and a description for their product while retailers or distributors may have their own images, colorways, and textual descriptions for their products. This can be challenging for search efficiency and can lead to potentially large disparities between metadata for identical products. Product metadata consists of the imagery and textual metadata including a product name assigned to the product, a product description, product imagery provided to demonstrate the product, including a single image, multiple images, frames of video or the like. Manufacturers and retailers may apply alternative descriptions and images to products. For example, and as shown in FIG. 2, a manufacturer may describe "cola, 330 ml single pack" with a front perspective drawing of a can of said cola 200*a*. A retailer may show the same cola 200*b*, with a textual description of "can of cola" and an image of the same can tilted. However, both describe the identical product. Similarly alternative images and descriptions may be provided for oats 201*a,b*, or chips/crisps 202*a,b* as seen in FIG. 2. For example in the case of "chips" and "crisps", the terminology for the same product differs depending on the geographical location of the typesetter.

While described herein as a manufacturer product and a retailer product, it will be appreciated that matching can be between product metadata from any two sources describing a product. It will be appreciated that often there is a correspondence between the manufacturer's view of a product and the retailer's view of a product.

As a first step 101 in a matching pipeline, image based hashing using global image hashing algorithms may be applied to determine duplicate imagery across datasets. This image or perceptual hashing is used to construct hash values that uniquely describe product images. A manufacturer's dataset 300 provides data describing its product range. Product images 301 are extracted. Hash values 302 are constructed that uniquely describe each product image. These hash values are indexed 303.

Similarly, based on the retailer dataset 304, product images 305 are hashed to provide image hash values 306. This hash value is compared against each hash in the index 303 to search for a nearest neighbor. If the nearest neighbor is within a threshold distance 102 or equivalently the distance between the hash and its nearest neighbor is less than a threshold value, then it is determined that there is a match 107 between the retailers product and the manufacturers product.

One suitable hashing algorithm is a P-Hash algorithm. This breaks an image down into small blocks for example 16×16 pixels. A discrete cosine transform is then applied to the blocks. The hash value that represents the image is a subset of the outputs of the DCT algorithm. In alternative configurations an AvgHash algorithm could also be used wherein an average pixel value is calculated across an image (again broken into blocks). The representation to be outputted is a binary vector. If the corresponding pixel value at position 0 is smaller than the mean, then the value is 0. If larger than the mean then the value is 1. The two dimensional matrix is converted to a one dimensional vector by concatenating each row. Similarly, D-Hash or Goldberg hashing can be applied.

However, where there are variants as described above, the hashing approach may not be suitable and the nearest neighbor may not be within a threshold or the distance between the image hash value of the retailer image and the image hash value of the manufacturer's image may be greater than a threshold. A separate multi-modal neural network system 103 may then be applied. This multi-modal neural network system combines the use of image data with textual metadata in multi-modal neural network approach.

Figure 1:
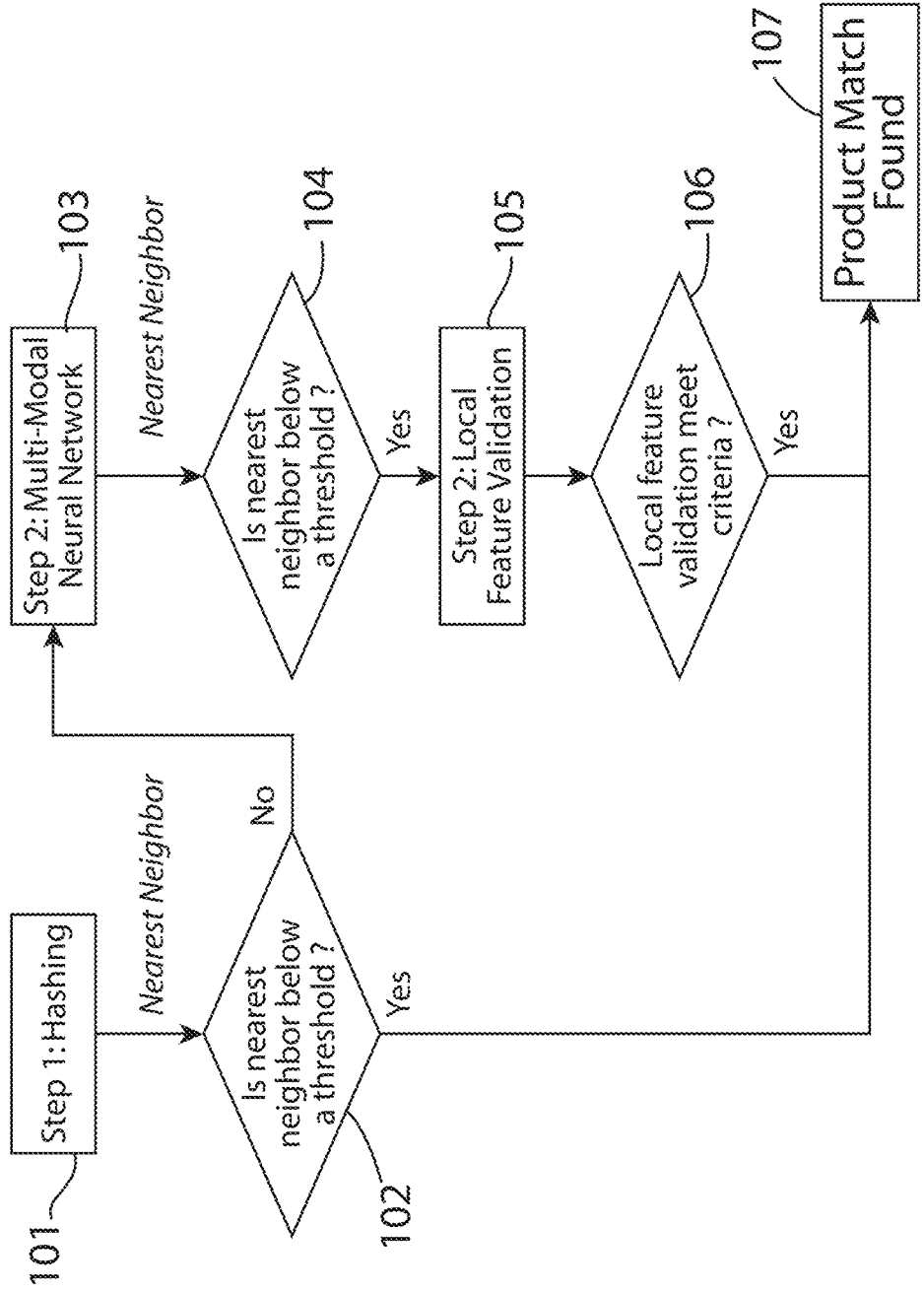
FIG. 1 is a flow chart of a product matching pipeline incorporating a matching and validation process in accordance with the present invention.

Step 2 as described in FIG. 1 is described in further detail below. A key feature of the multi-modal neural network approach proposed herein is that textual metadata is ingested into the alongside image metadata to calculate a feature embedding for each product. Feature embeddings are also known as feature descriptors or vectors. Nearest neighbor criteria (104) are applied as outlined further below. If the nearest neighbor is with a threshold distance then local feature validation (105) is implemented. Once local validation criteria (106) have been met a product match (107) is then deemed to have been found. Further details of the system are described below.

In accordance with the present application, the multi-modal neural network approach proposed consists of multiple inputs and multiple internal neural network architectures combined into a single network for training purposes. The model proposed uses a combination of both image and text data as inputs into a neural embedding network. Training techniques use pairs of multimodal inputs rather than large categorised groupings. Training techniques generate a multi-modal neural network which generates discriminate feature embeddings for each set of data forward propagated through.

Utilizing the trained network model requires the generation of a feature embedding/descriptor for each product to be matched. Products (and their feature embeddings) from a retailer side are grouped and loaded into a search structure, for example a K-dimensional tree for efficient matching. It will be appreciated that grouping is based on identical products being grouped together. To match the product from a retailer against the manufacturer data set, nearest neighbor searches are conducted. In one embodiment the nearest neighbor search may be implemented using the K-dimensional tree structure.

Distances between embeddings are determined. If the distance between two embeddings is within a predetermined threshold, it is considered that these products are likely to be a match. However to further confirm the validity of the match the products are sent to a validation stage 106. The validation stage confirms the image match. This further reduces false positive matches and will be described in further detail below.

Figure 4:
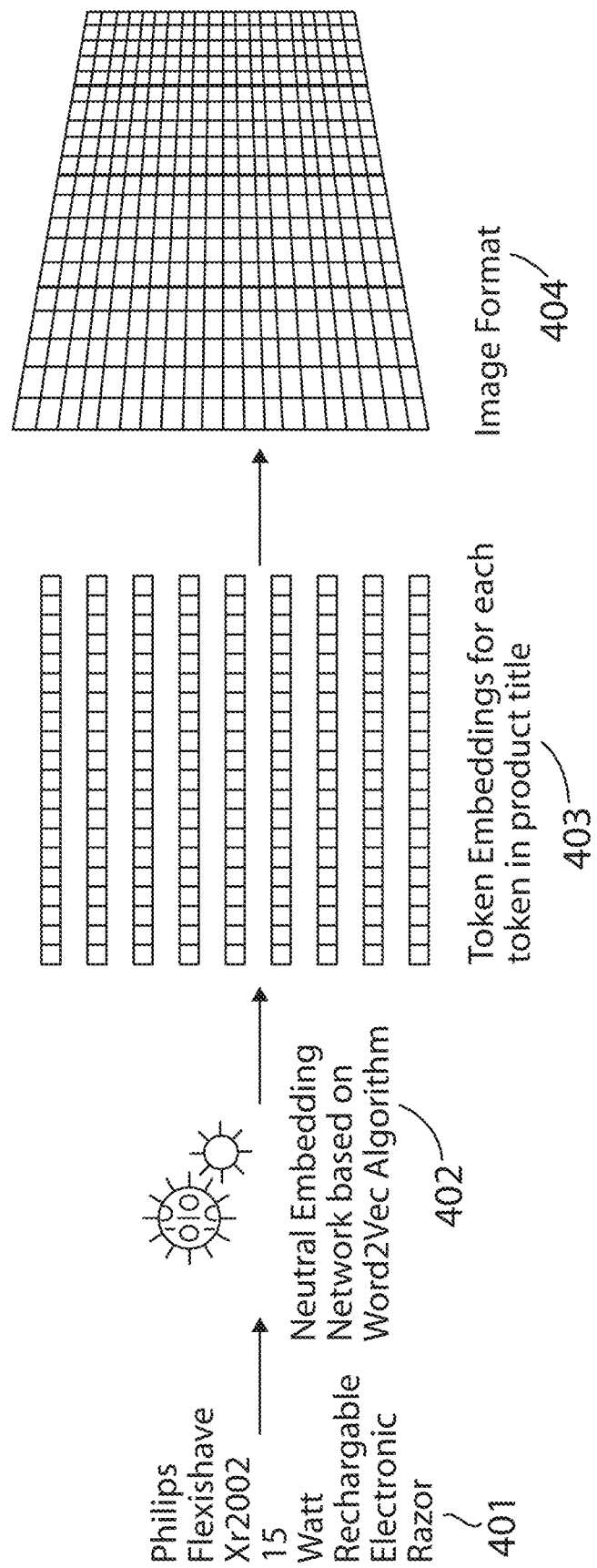
FIG. 4 is a depiction of an embedding process in accordance with the present invention.

In the model proposed, the first step is to convert textual meta-data to an image format suitable for processing with a convolutional neural network. This is shown in FIG. 4. The first step in is to convert textual metadata to an image format such that it can be processed with a convolutional neural network. This is achieved using a neural network to convert each token within the textual data set to a contextual embedding, i.e. a contextual vector value. The textual metadata is extracted from each product description. This textual data is then pre-processed with tokenization and stemming Additional pre-processing steps are applied to identify and remove additional issues specific to the product metadata for example pricing symbols and non-textual tokens which may impact the efficiency of the search and are not relevant to the match. These pre-processing steps may be heuristic. The present invention trains the neural network on the dataset (dataset of manufacturer's products). For example, information relating to a manufacturers product is input at step 401.

A suitable algorithm for such training may include a Skip-Gram algorithm or other Word2Vec model, however it will be appreciated that other suitable algorithms may also be implemented, for example GloVE (Global Vectors), BERT (Bidirectional Encoder Representations from Transformes), ELMo or ULMFiT (Universal Language Model Fine-Tuning). Applying this algorithm represents each word in a large text as a vector in a space of N dimensions where similar words are close to each other. It will be appreciated that the output of this process is a neural network model that can take a textual token as an input and output a N-dimensional feature embedding 403 which represents each token of the textual metadata. Tokens that are contextually relevant will have embeddings which are "close" in a multi-dimensional feature space.

It is necessary to convert the data into an image format for use in a neural network. The feature embeddings are stacked into an N×M size matrix where N is the number of tokens and M is the embedding size used by the model. The feature embeddings may be stacked vertically 404 to provide an image format.

For efficient use of the models it is desirable that each input has a static size. Therefore text inputs with less than a K number of tokens are padded so N×M is always the same size regardless of the input. These padding variables are ignored during the multi-modal model training. It will be appreciated that in contrast to inputting tokens as a single integer value, the present application uses embeddings as input tokens where tokens that are semantically similar will have semantically similar embeddings. This adds an extra degree of semantic knowledge to the model. Rather than treating each token as an independent entity, the model proposed takes advantage of relationships between entities. For example, the tokens "kg" and "kilograms" represent very similar concepts. The mechanisms proposed takes advantage of this similarity rather than treating both tokens independently.

Figure 5:
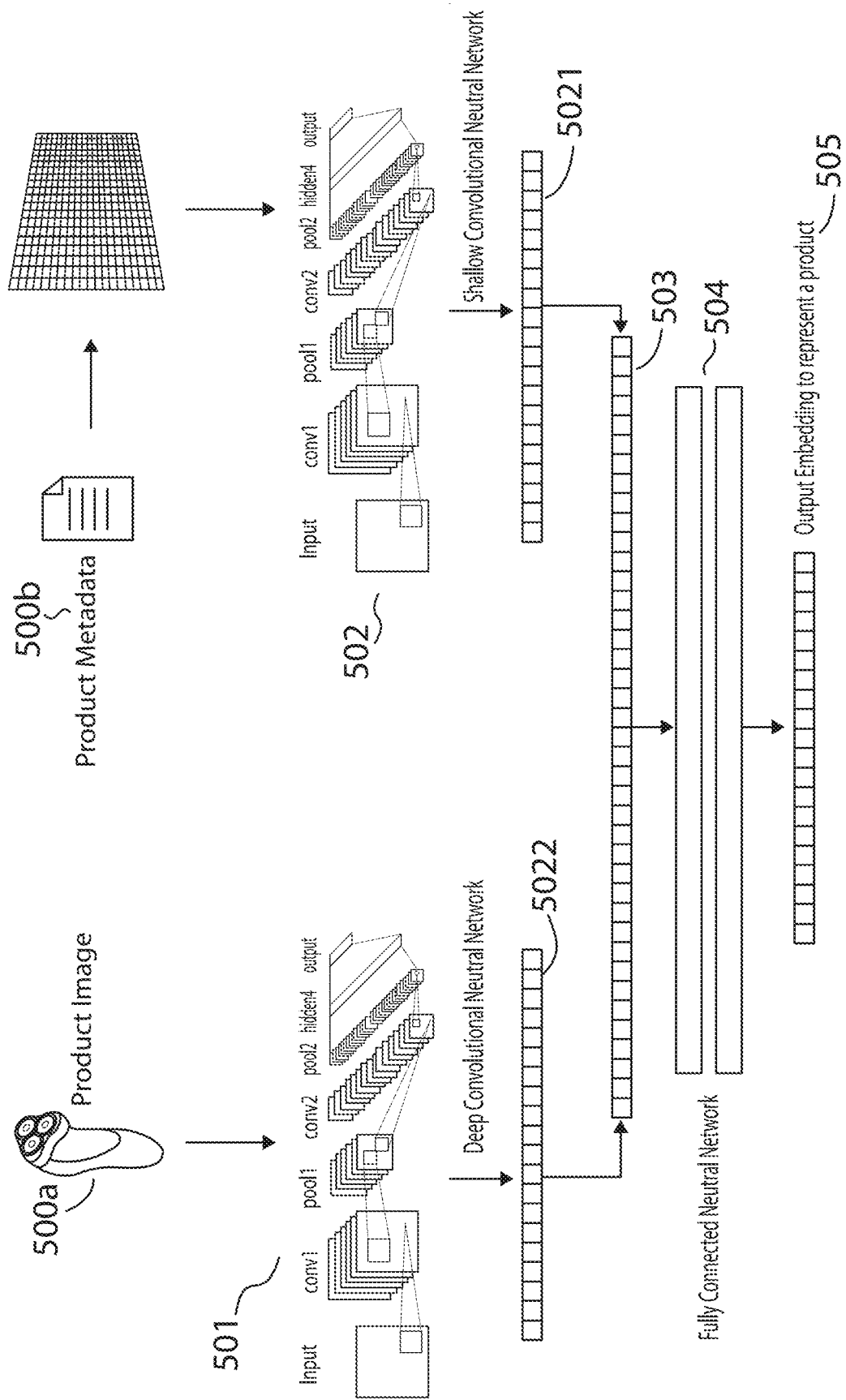
FIG. 5 describes the process of using product image and product metadata to provide an output embedding of a product.

The network architecture proposed is as shown in FIG. 5. The neural network design consists of multiple internal neural network architectures combined into a single network for training purposes.

As shown in FIG. 5, the approach separately considers product image data and product metadata in two separate paths 501, 502. The first path incorporates a convolutional neural network. In the embodiment of FIG. 5 this neural network is a deep convolutional neural network. This neural network is implemented to describe the semantic content of an image of a product. This semantic content is used to generate the image side of the input pair 5022.

The second path incorporates a second neural network. This second path processes the product metadata to convert textual content into semantic representations. The second neural network is a shallow convolutional neural network which converts textual content into semantic representations 5021. Shallow neural networks have typically a single hidden layer where as deep neural networks have a plurality of hidden layers.

The outputs of both the first path 501 and the second path 502 are concatenated to provide the input into a fully connected multi-layer perceptron network 504. It will be appreciated that as all of the layers are connected, the entire model is trained as a single entity and all the layers are updated during the training phase. The output embedding, output from the fully connected neural network represents the product.

This connection of the layers facilitates in the training of the full model incorporating the first and second paths as a single entity. The entire model can be trained as a single entity with all layers updated during the training phase.

Conventionally, in a supervised learning environment, training a neural network involves assigning class labels to each input prior to training. The entire dataset is split into train and test subsets with each subset consisting of a set of input data alongside a class label which describes each input. In the method and system as described herein, class-based training is not feasible. Metadata is not being categorized, rather the mechanisms proposed herein are applied to the matching of data. It will be appreciated that there is generally only one item per class, i.e. the product which is being matched and hence class labels as outlined above are not feasible.

Training, in accordance with the present invention uses a combination of both image and text data as an input into a neural embedding network. The training technique uses pairs of multi-modal inputs. This is in contrast to the use of large categorised groups of inputs as is the norm. The use of multi-modal inputs enables accurate training of the models without large numbers of data instances per class. Pairs can be positive pairs or negative pairs. It will be appreciated that a positive pair is a correct match where a manufacturer product matches a retailer product. Negative pairs are not matches. In one training configuration, for x number of positive pairs, 2x negative pairs are generated. In a further configuration for x number of positive pairs there as x number of negative pairs. Preferably the negative pairs are quite similar in feature space, i.e. with both products having similar characteristics. It will be appreciated that this facilitates distinguishing very fined grained similarities between products as outlined above Considering the training process, and in an overview thereof, prior to the first epoch/training stage, pairs are randomly generated across the data set. For each product input a random product match is selected.

Subsequent to the first epoch, feature embeddings are generated from the output model after the first epoch for each product within the data set. An embedding is generated for each training example, which is the output propagating the training example through the latest model.

These feature are loaded into a nearest neighbor search index, for example a K-dimensional tree index. Every leaf note is a k-dimensional point. Every non-leaf note splits the hyperplane that divides the space into two parts which are known as half-spaces. Points to the left of this hyperplane are represented by the left subtree of that node and points to the right of the hyperplane are represented by the right subtree. For each product on the left hand side i.e. represented by the left subtree, the nearest neighbors that fall beneath a distance threshold are found. From this subset of nearest neighbors a negative product is selected at random. This ensures that all of the negative pairs of products from the first cycle on (i.e. from the first epoch onwards) are contextually similar but not matches. The pairs of products are then assigned a positive or negative class as the class label for the model. Based on these class labels the model is trained to minimize the errors in determining whether a pair of products are positive or negative.

The model which underpins the searching process consists of multiple inputs and multiple internal neural network architectures combined into a single network for training purposes.

As outlined above and when considering the matching process, the output of the final fully connected layer is a description embedding for a product, 505. At matching time 104, feature embeddings between products are compared and if the distance threshold is beneath a predetermined value, it is determined that the products are a likely match.

The final verification of the match incorporates a geometric verification of the images of the products. As shown in FIG. 6, the two products that are considered likely to be a match are compared. First there is a determination of corresponding visual regions that correlate across the two images 601. A geometric model is selected for application. This geometric model is applied to fit each of the corresponding points 602. Matches that do not fit the model, i.e. any match found outside of geometric structure of objects are eliminated. The number of matches that meet the geometric consistency test is determined 603. If the number of corresponding matches is above a threshold, then the match determined by the model outlined above is verified. The final verification step is optional. It will be appreciated however, that this step reduces the false positive rate of matches. While computationally intensive, where the data set is small (i.e. matched products), the verification leads to increased accuracy.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A method of matching a first product with a second product, comprising:

converting a first product metadata comprising an image metadata and a textual data to a first product feature vector;

determining a distance between the first product feature vector and a second product feature vector of the second product, the second product feature vector stored in a database of product feature vectors, wherein the determining the distance further comprises performing a nearest neighbor search wherein the nearest neighbor search further comprises grouping a plurality of first product feature vectors and indexing the grouping, and applying at least one of a locally-sensitive hashing, k-dimensional trees, vantage point trees, and a hierarchical clustering; and comparing the distance to a threshold distance, and wherein when the distance is within the threshold distance validating a match between the first product feature vector and the second product feature vector, wherein the validating further comprises geometrically verifying the image metadata of the first product corresponds to an image metadata of the second product, and wherein the geometrically verifying the image metadata of the first product further comprises determining corresponding visual regions that correlate across the image metadata of the first product and the image metadata of the second product; selecting a geometric model to apply to the determined corresponding visual regions; determining a number of matching points of interest within the geometric model; and comparing the number of matching points with a predetermined threshold and verifying the image metadata of the first product based on the comparison.

2. The method of claim 1, wherein the converting the first product metadata to the first product feature vector further comprises calculating a feature embedding for each of the products.

3. The method of claim 2, wherein the calculating the feature embedding for each of the products further comprises extracting a textual metadata and preprocessing the textual metadata to filter unnecessary text.

4. The method of claim 3, wherein the preprocessing further comprises at least one of tokenization and stemming of the textual metadata to form a plurality of textual tokens.

5. The method of claim 4, further comprising a step of representing each of the plurality of textual tokens as a semantic feature embedding.

6. The method of claim 5, further comprising stacking the semantic feature embedding for each of the plurality of textual tokens into an N×M matrix, wherein N is the number of tokens in the plurality of tokens and M is an embedding vector size.

7. The method of claim 6, wherein the calculating the feature embedding for each of the products further comprises representing the image metadata as a semantic feature embedding.

8. The method of claim 6, wherein the calculating the feature embedding for each of the products further comprises combining the semantic feature embedding representing the textual token and the semantic feature embedding representing the image to provide the product feature vector for each of the products.

9. The method of claim 1, wherein the nearest neighbor search is performed between the first product feature vector and a plurality of product feature vectors in the database of product feature vectors.

10. The method according to claim 8, wherein the converting first product metadata comprising image metadata and textual data to a first product feature vector further comprises using a first neural network model to generate the semantic feature embedding representative of the textual token and using a second neural network model to generate the semantic feature embedding representative of the image, concatenating outputs of the first neural network model and the second neural network model and inputting the concatenation as an input to a third neural network model to generate the first product feature vector.

11. The method according to claim 10, wherein the first neural network model, the second neural network model, and the third neural network model are trained using pairs consisting of a plurality of the first products and a plurality of the second products.

12. The method according to claim 10, wherein prior to the converting first product metadata comprising image metadata and textual data to a first product feature vector, the method further comprises extracting global features from images associated with the first product and images associated with the second product and comparing the extracted global features wherein the first product is determined to match the second product based on a number of the global features of the first product and a number of the global features of the second product exceeding a first threshold, and wherein the converting first product metadata comprising image metadata and textual data to a first product feature vector is performed if the number of the global features of the first product and the number of the global features of the second product is less than a second threshold.

13. A computer readable programmable medium carrying a program stored thereon which when executed by a processor implements the method according to claim 1.

14. A system for product recognition comprising:
means for converting a first product metadata comprising an image metadata and a textual data to a first product feature vector;
means for determining a distance between the first product feature vector and a second product feature vector of the second product, the second product feature vector stored in a database of product feature vectors, wherein the determining the distance further comprises performing a nearest neighbor search, and wherein the nearest neighbor search further comprises grouping a plurality of first product feature vectors and indexing the grouping, and applying at least one of a locally-sensitive hashing, k-dimensional trees, vantage point trees, and a hierarchical clustering; and
means for comparing the distance to a threshold distance and wherein when the distance is within the threshold distance, means for validating a match between the first product feature vector and the second product feature vector, wherein the validating further comprises geometrically verifying the image metadata of the first product corresponds to an image metadata of the second product, wherein the geometrically verifying the image metadata of the first product further comprises determining corresponding visual regions that correlate across the image metadata of the first product and the image metadata of the second product; selecting a geometric model to apply to the determined corresponding visual regions; determining a number of matching points of interest within the geometric model; and comparing the number of matching points with a predetermined threshold and verifying the image metadata of the first product based on the comparison.

* * * * *